Inventor
FRANS P.J. BOLSSENS

Feb. 16, 1971   F. P. J. BOLSSENS   3,563,117
DEVICE FOR STRIPPING INSULATION FROM INSULATED WIRES
Filed April 23, 1968   3 Sheets-Sheet 3

Inventor
FRANS P.J. BOLSSENS

Attorney

United States Patent Office 3,563,117
Patented Feb. 16, 1971

3,563,117
DEVICE FOR STRIPPING INSULATION FROM INSULATED WIRES
Frans Pharailda Jozef Bolssens, Heide-Kalmthout, Belgium, assignor to International Standard Electric Corporation, New York, N.Y.
Filed Apr. 23, 1968, Ser. No. 723,386
Claims priority, application Netherlands, Apr. 27, 1967, 6705924
Int. Cl. H02g 1/12
U.S. Cl. 81—9.5                        20 Claims

ABSTRACT OF THE DISCLOSURE

An apparatus for stripping insulation from wire includes a pistol shaped frame with a pneumatic trigger, a cam mounted on the frame and being longitudinally movable between a first position and a second position, a pair of gripping and insulation cutting jaws respectively mounted on the frame, and a pair of springs, which are actuated by the trigger to cut and strip the insulation. One of the springs is interposed between the gripping jaws and the cam, and the other between the cutting jaws and the cam respectively. The springs are pretensioned by the cam disposed in the first position for urging the gripping jaws and the cutting jaws toward their respective operative positions. The actuating trigger pneumatically drives the cam from the first position to the second position to release the springs from their pretensioned positions into their operative positions for enabling the gripping jaws and cutting jaws to respectively grip the wire and cut the insulation from the wire.

---

The present invention relates to a device for stripping insulation from at least one insulated wire and including a frame supporting a pair of relatively movable gripping jaws and a pair of relatively movable insulation cutting jaws, said pairs of jaws being also relatively movable with respect to one another.

Such a device is already known from the U.S. Pat. 2,601,797. Its operation however involves force to be supplied by the operator and this is detrimental to continuous use of the device. Only one wire can be stripped of insulation at a time. Moreover, in certain cases particularly when a group of several wires or stitch of a cable form are led off from a branch or stem of such a cable form, it is impossible to remove the insulation from these wires starting at a predetermined distance from this branch since this known device removes the insulation starting from the free ends of the wires.

It is therefore an object of the present invention to provide an improved device of the above type which does not present these disadvantages.

The device according to the invention is characterized in that it includes a single common control means whose displacement in a direction parallel to said wire(s) controls all three relative displacements.

According to another characteristic of the present device said control means include at least one common control rod longitudinally displaceable in two opposite senses and at least one of said gripping jaws and at least one of said insulation cutting jaws are pre-tensioned in their rest position and automatically displaced from said rest position into operative position wherein they grip the wire and cut the insulation of said wire respectively due to at least part of the energy stored by said pretensioning being freed when said common control rod is displaced in one of said two senses.

It should be noted that the use of pre-tensioned insulation cutting jaws is already known from the Dutch Pat. No. 77217 (F. Bolssens 1), but in the device disclosed therein an additional rotation of these jaws is required in order to effectively cut the insulation.

According to a further characteristic of the present device said one gripping jaw and said one insulation cutting jaw are mounted on a first and a second cocked individual control rod respectively and are thus pretensioned.

Due to the fact that the present device includes a common control rod it has been possible to realize a handy device of relatively small weight and due to the individual control rods being cocked in their rest position they can be displaced into their operative position with a high speed by virtue of the energy of compressed springs being released, thus rendering the operation speed of the device correspondingly high. This operation speed has further been increased by arranging the device in such a manner that after having stripped off the insulation of a wire it is possible to immediately remove this wire, i.e. before the common control rod has been returned to its rest position.

The present device has moreover been rendered easily operable as the single common control rod is a pneumatically operated piston which is mounted in a cylinder and the displacement of which is controlled by a trigger member capable of operating a valve which controls the communication of this cylinder with a source of compressed air.

Moreover due to the use of compressed air which enables to exert a relatively high force the present device is adapted to strip the insulation of a plurality of wires simultaneously.

The above mentioned and other objects and features of the invention will become more apparent and the invention itself will be best understood by referring to the following description of an embodiment taken in conjunction with the accompanying drawings wherein.

Figure 1:
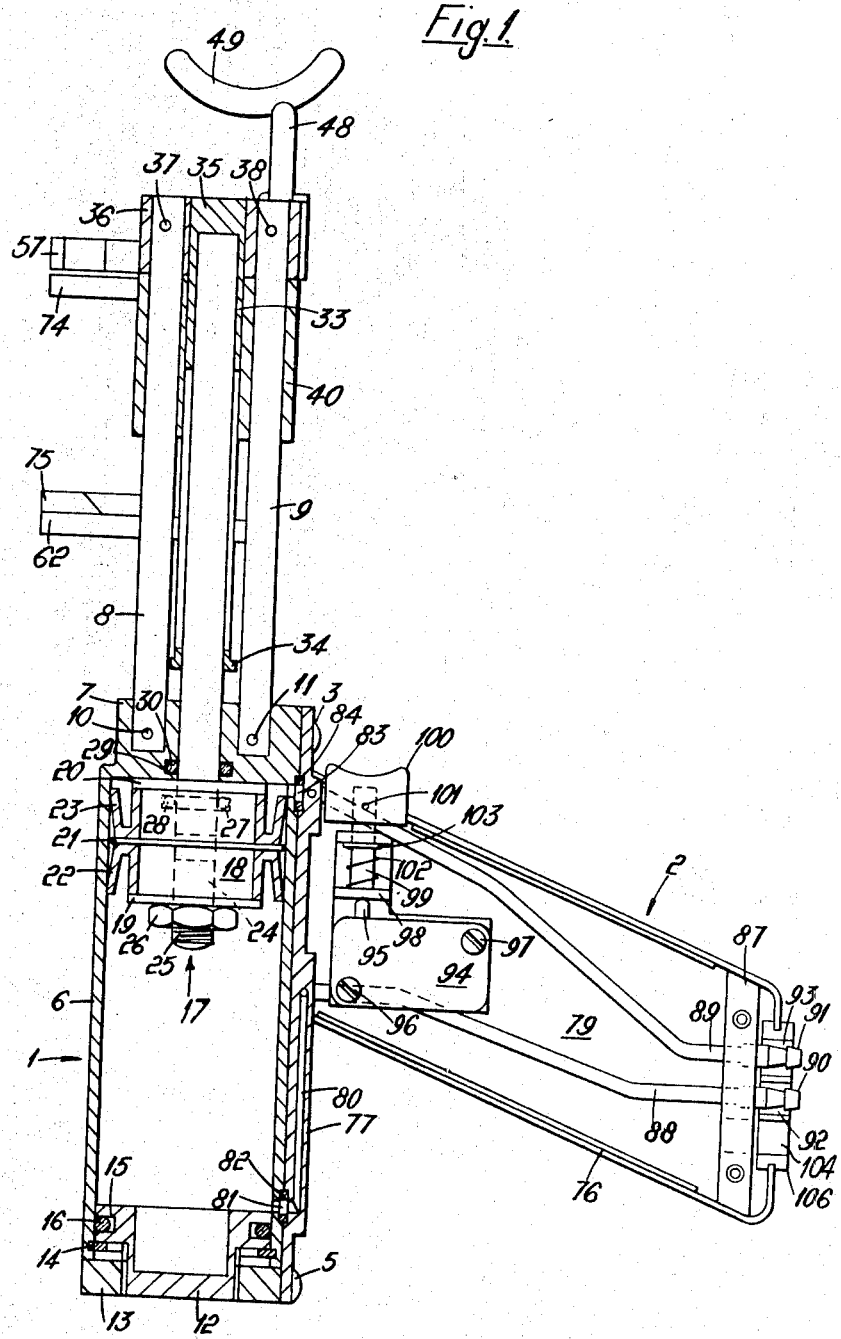
FIG. 1 is a longitudinal cross-section of a device according to the invention along line I—I in FIG. 2 and considered in the direction of the arrows.

The device for stripping insulation includes a longitudinal body generally indicated by reference numeral 1 onto which a handgrip generally indicated by reference numeral 2 is fixed by means of screws such as 3, 4 and 5.

The longitudinal body 1 includes a hollow air cylinder 6 which is open at its one end and which is closed at its other end by an integral part 7 which is partially block-shaped and wherein two parallel guide rods 8 and 9 are fixed by means of pins 10 and 11 respectively. The open end of the cylinder 6 is closed by means of a cap 12 which is engaged with a tight fit in this open end. A ring-shaped piece 13 is screwed on the cap 12 and abuts against the edge of the cylinder 6, thus preventing this cap 12 from being displaced towards the inside of the cylinder 6. The displacement of the cap 12 in the opposite direction is prevented by a spring washer 14 which is engaged in a peripheral groove in the inner wall of the cylinder 6 and which makes contact with the cap 12. The latter cap 12 is further provided, with a peripheral groove 15 in which a packing ring 16 is arranged. This packing ring 16 ensures air tightness between the inside of the cylinder 6 and the atmosphere.

A piston assembly generally indicated by reference numeral 17 is slideable mounted within the cylinder 6. This piston assembly 17 includes a cylindrical body 18 provided with two outer flanges 19, 20 and a center flange 21 which protrudes beyond the cylindrical surface of this body 18. The latter flanges 19, 20, 21 delimit two seatings for packing rings 22 and 23 which have a channel-shaped cross-section and which make contact with the cylinder 6, thus ensuring air tightness between the two compartments of the cylinder 6 separated by the piston assembly 17. The cylindrical body 18 of the piston assembly 17 further has a cylindrical passage which is parallel to the guide rods 8, 9 and part 24 of which is threaded. A piston rod or common control rod 25 is engaged in this passage and screwed in the threaded part 24 thereof; it is further secured by means of the lock nut 26. A packing ring 27 is arranged around the piston rod 25 in a peripheral groove 28 of the piston body 18 in order to ensure air tightness between the above passage and the atmosphere. For the same reason a packing ring 29 is mounted around this piston rod 25 in a peripheral groove 30 of the block-shaped part 7.

Figure 2:
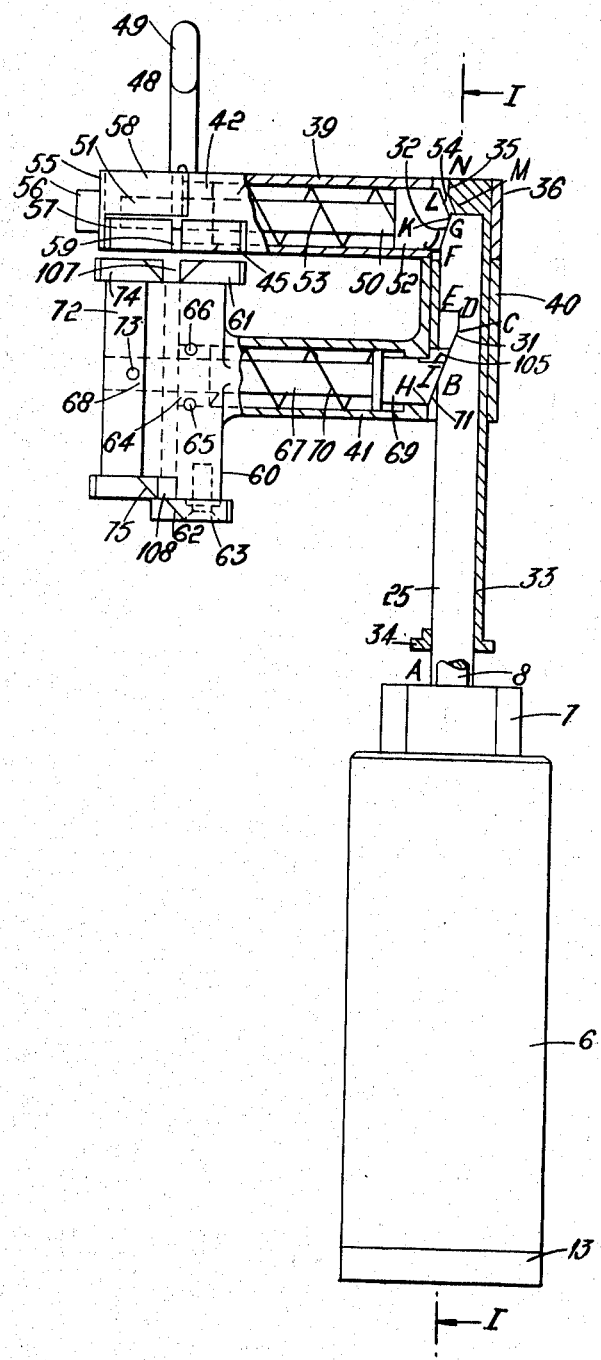
FIG. 2 is a side view from left to right of the device shown in FIG. 1, this side view being partially in cross-section and some parts having been omitted.
Figure 3:
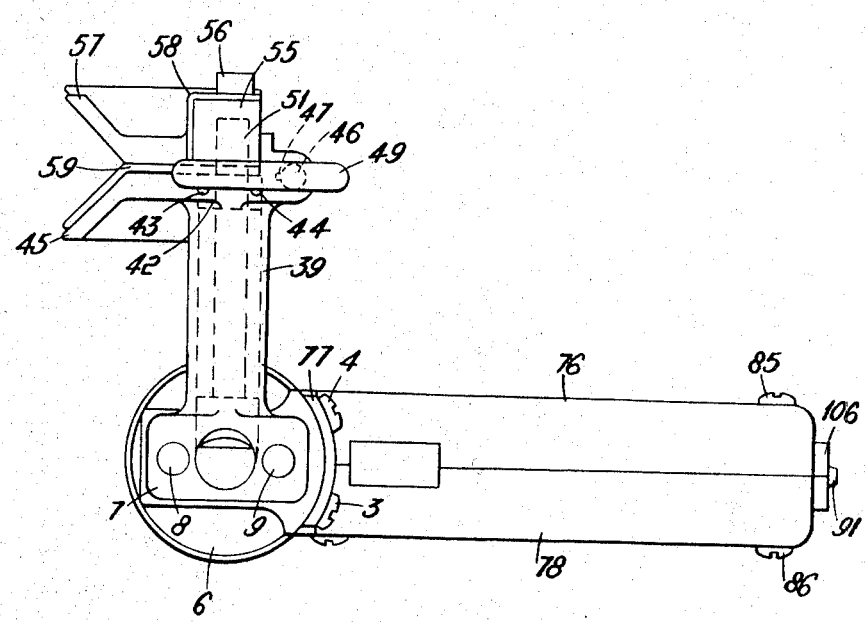
FIG. 3 is a side view from top to bottom of the device shown in FIG. 1.

The above piston rod 25 has two lateral cam surfaces 31 or BCDE and 32 or FG and is slideably mounted within a cylindrical casing 33. The latter casing 33 has a flange 34 at its open end, a lateral cam-shaped part 35 or GMN near its closed end and therebetween two lateral slots facing the cam surfaces 31 and 32 of the piston rod 25, as is clearly visible on FIG. 2.

A carrier 36 is fixedly secured to the guide rods 8, 9 by means of the pins 37, 38 and has an integral hollow tubular part 39 which extends in a direction perpendicular to the casing 33. A carrier 40 is slideably mounted on the guide rods 8, 9 and has an integral T-shaped piece 41, 60. The former part 41 thereof is tubular hollow and parallel to the tubular part 39 whereas the latter part 60 thereof is perpendicular to it. The above casing 33 is slideably mounted in a passage through the carirers 36 and 40.

The hollow tubular part 39 is closed at its open end by a ring-shaped piece 42 which has a central opening (not shown) and which is fixed to this tubular part 39 by means of the pins 43 and 44. A gripping jaw 45 is laterally fixed on the tubular part 39 by means of a screw (not shown). The latter tubular part 39 further has a lateral extension provided with a cylindrical passage 46 having a longitudinal groove 47. This passage 46 is parallel to the guide rods 8, 9 and is adapted to receive with a tight fit the one end of a distance holding piece 48 having a curved part 49 at its other end. A longitudinal rib (not shown) of this one end hereby engages in the above groove 47, thus preventing a rotation of this distance holding piece 48. An individual control rod 50 protrudes with its one end 51 through the above mentioned central opening in the ring-shaped piece 42 and is integral at its other end with a cylindrical guide block 52 which fits in the tubular part 39. The individual control rod 50 is slideable in the latter tubular part 39 and its one and other ends 51, 52 are hereby guided by the last mentioned central opening in the ring-shaped piece 42 and by the inner wall of this tubular part 39 respectively. A compressed helical spring 53 is arranged around the rod 50 and between the parts 42 and 52 and thus urges this individual control rod 50 continuously in the direction of the common control rod 25. More particularly part JK of the cam surface 54 or JKL of the guide block 52 is normally urged into contact with the cam surface 32 of F6 of the common control rod 25. A support 55 is secured to the above end 51 of the rod 50 by means of the nut 56 and a gripping jaw 57 is laterally fixed on this support 56 by means of a (not shown) screw. The tubular part 39 and the support 55 are normally located at a small distance from each other and in order to prevent pieces, e.g. of wire and insulation to be introduced between these parts 39, 55 a cover 58 has been provided. This cover 58 is fixed on the support 55 by means of the above nut 56 and partially overlaps the gap separating these parts 39 and 55. The gripping jaws 45 and 57 constitute a gripping device and normally delimit a groove 59 adapted to receive a plurality of insulated wires.

An insulation cutting jaw 61 is laterally fixed to one end of the transverse part 60 of the T-shaped piece 41, 60 by means of a (not shown) screw, and a wire cutting jaw 62 is laterally fixed to the other end of the transverse part 60 with the help of screw. The hollow tubular part 41 is closed at its open end by a ring-shaped piece 64 which has a central opening (not shown) and which is fixed to this tubular part 41 by means of the pins 65 and 66. An individual control rod 67 protrudes with its one end 68 through the above mentioned central opening in the ring-shaped piece 64 and is integral at its other end with a guide block 69. The latter guide block 69 fits in the tubular part 41 and has a flat lateral surface 105. The individual control rod 67 is slideable in the latter tubular part 41 and its one and other ends 68, 69 are hereby guided by the last mentioned central opening in the ring-shaped piece 64 and by the inner wall of this tubular part 41 respectively. A compressed helical spring 70 is arranged around the rod 67 and between the parts 64 and 69 and continuously urges this individual control rod 67 in the direction of the common control rod 25. More particularly the cam surface 71 or HI of the guide block 69 is urged into contact with part of the cam surface 31 or BCDE of the common control rod 25. A support 72 is transversally secured to the above end 68 of the control rod 67 by means of the pin 73. An insulation cutting jaw 74 is laterally fixed to one end of this support 72, whereas a wire cutting jaw 75 is laterally secured to the other end of this support by means of (not shown) screws. The insulation cutting jaws 61 and 74 which are mounted side by side in a same plane constitute an insulation cutting device and normally delimit a groove 107 adapted to receive a plurality of insulated wires. Likewise the wire cutting jaws which are also mounted adjacent to each other constitute a wire cutting device and normally delimit a groove 108 also adapted to receive a plurality of insulated conductors. Hereby it should be noted that the grooves 59, 107 and 108 are all in line and parallel to the common control rod 25. Together they form an open-ended channel.

The above handgrip 2 includes a handgrip-shaped frame 76 which is soldered to a part 77 and the open lateral side of which is closed by means of a cover 78 so as to form a hollow housing 79. The part 77 is secured to the cylinder 6 by means of the screws such as 3, 4, 5 as already mentioned above and the latter cover 78 is fixed on the frame 76 by means of screws such as 85, 86. Part 77 has a longitudinal channel 80 which communicates at one end with the inside of the housing 79 via a passage (not shown), and at the other end with the inside of the cylinder 6 via a passage 81. A packing ring 82 is mounted in this passage 81 at the place of contact of the cylinder 6 and the part 77 in order to ensure air tightness at this location. The cylinder 6 also communicates with the inside of the housing 79 via the passage 83 wherein a packing ring 84 is mounted at the place of contact of the cylinder 6 and the part 77 in order also to ensure air tightness at the location.

A support 87 is mounted within the housing 79 and is integral with two conduits 88 and 89 the one ends of which communicate with the above mentioned passage (not shown) leading to channel 80 and the passage 83 respectively. At their other ends 90, 91 these conduits 88 and 89 project through respective passages 92, 93 in the piece 106 constituting the lower part of the handgrip 2. These other ends 90, 91 are adapted to be connected to a source of air under pressure via a solenoid controlled valve (not shown).

A micro-switch 94 provided with an armature 95 is mounted on the frame 76 by means of screws 96 and 97. A U-shaped bracket 98 is mounted on the same frame 76 and the parallel parts of this bracket have circular openings (not shown) supporting a small axle 99. A trigger member 100 is secured to one end of this axle 99 by means of the pin 101 and a helical spring 102 is arranged around the axle 99 and between one of the parallel parts of the bracket 98 and a washer 103 secured to the axle 99. The micro-switch 94 is connected via an electric cable (not shown) passing through an opening 104 in the part 106 to the above solenoid controlled valve. The latter valve normally establishes a communication between the above source of air under pressure and conduit 88 and inhibits the communication between this source and conduit 89. When the trigger member 100 is operated the valve reverses these connections which remain established as long as the trigger member 100 is not released.

In a telephone exchange the electrical cabling of each of the mounting bays is constituted by a plurality of cable forms each having a plurality of branches formed by groups of wires. At predetermined locations of each of these branches a group or stitch of wires is led off of the branch and is electrically connected to a plurality of circuits or devices mounted on the mounting bay at a predetermined distance from this branch. Therefore when preparing such cable forms the wires of each stitch thereof must have their insulation removed over a first predetermined distance starting at a second predetermined distance from the corresponding branch.

This is possible by means of the above described insulation stripping device when the distance between the curved end part 49 of the distance holding part 48 and the insulation cutting device 61, 74 is equal to the last mentioned second distance, whereas this device is the distance between the wire cutting and insulation cutting devices 62, 75 and 61, 74 is equal to the last mentioned first distance.

The curved end part 49 of the distance holding piece 48 is first brought into contact with the branch of the cable form of which a stitch of e.g. 5 wires has been led off and the wires of this stitch are then introduced in the open-ended channel 59, 107, 108 formed by the pair of gripping jaws 45, 57, the pair of insulation cutting jaws 61, 74 and the pair of wire cutting jaws 62, 75 in such a manner that each of the insulated wires longitudinally extends in this channel. Hereby the width of this channel is only somewhat larger than the diameters of these insulated wires, so that these wires are located side by side in the channel. Finally the trigger member 100 is operated due to which the following operations are performed: the insulated wires are gripped between the gripping jaws 45, 57; these wires are cut by the wire cutting jaws 62, 75; the insulation of these wires is cut by the insulation cutting jaws 61, 74; the carrier 40 is displaced towards the cylinder 6 in order to strip off the cut insulation from these wires; the gripping jaws are displaced to their rest position and the insulation cutting and wire cuting jaws are displaced to their rest position.

The above operations following the actuation of the trigger member 100 are now described in more detail. Hereby it should be noted that the various parts of the device are initially in the rest position shown.

When the trigger member 100 is actuated against the action of the spring 102 the small axle 99 operates the armature 95 of the micro-switch 94 which thus closes an electrical circuit for the above solenoid controlled valve. Consequently this valve establishes a communication between the above mentioned source of air under pressure and the conduit 89 and disconnects it from the conduit 88 so that compressed air enters the upper compartment of the cylinder 6 via the conduit 89 and the passage 83. Due to this the piston assembly 17 and hence the common control rod 25 are both displaced in the direction of the cap 12. By the displacement of the cam surfaces 31 or BCDE and 32 of FG of the rod 25 the cocked individual control rods 50 and 67 are both displaced in the direction of the piston rod 25 under the action of the freed energy of the respective springs 53 and 70.

Due to the displacement of the individual control rod 50 the movable gripping jaw 57 is displaced towards the fixedly mounted gripping jaw 45 so that the above insulated wires are gripped between these jaws. Due to the displacement of the cocked individual control rod 67 the movable insulation cutting and wire cutting jaws 74 and 75 are displaced in the direction of the fixedly mounted insulation cutting and wire cutting jaws 61 and 62 by the springs 53 and 70 respectively. At a certain moment of the travel of the wire cutting jaw 75 the cutting of the wires is started by the cooperation of this wire cutting jaw with the fixedly mounted wire cutting jaw 62. Also, at a certain moment of the travel of the insulation cutting jaw 74 a lateral cut is made in the insulation of each of the wires, whereas another lateral cut is made in the insulation of these wires by the fixedly mounted insulation cutting jaw 61. These wire cutting and insulation cutting operations are in general finished when the common control rod 67 has reached the end of its travel i.e. when point I of the cam surface 71 or HI coincides with point C of the cam surface 31 or BCDE. However it may happen that more particularly the wire cutting operation is not yet finished at that moment. Therefore the movable wire cutting jaw 75, and also the insulation cutting jaw 74, is maintained in the position attained during a time interval corresponding to the distance CD i.e. until the above point I and point D coincide.

At that moment the part DE of the cam surface 31 of the common control rod 25 comes into contact with the flat surface 105 of the guide block 69 of the individual rod 67. Due to this the latter rod 67 and hence the tubular part 41 and the associated elements, such as the insulation cutting jaws 61, 74 are simultaneously displaced away from tubular part 39 i.e. from the gripping jaws 45, 57. Since cuts have been made in the insulation of the insulated wires by the insulation cutting jaws 45, 57 and since these wires have already been cut by the wire cutting jaws 62, 75, it is clear that due to the displacement of the insulation cutting jaws 61, 74 the insulation will be stripped from these conductors.

From the above it follows that the insulation has been stripped from the wires over said first predetermined distance and starting at said second predetermined distance from the branch of the cable form and that the distance holding part 48 in fact constitutes a distance measuring member adapted to measure a length equal to the distance between its curved end part 49 and the wire cutting jaws 62, 75.

When during its travel the tubular part 41 comes into contact with the flange 34 of the casing 33 the latter casing 33 is displaced towards the block-shaped part 7 until it abuts against the latter. Consequently the cam surface 35 or GMN of this casing 35 is moved in the same direction due to which the individual control rod 50 is displaced in a direction away from the common control rod 25. At the moment the displacement of the casing 33 is prevented by the part 7, point K of the cam surface 54 or JKL of the guide block 52 of the control rod 50 makes contact with the surface MN of the above cam surface GMN. The movable gripping jaw 57 is then at the same distance from the fixedly mounted gripping jaw 45 as in the rest position shown so that the number of skinned wires may easily be removed. The displacement of the part 40, 41, 60 is stopped when it comes into contact with the carrier 36. During the further displacement of the control rod 25 the spring 70 is compressed to its initial value.

When the trigger member 100 is released the micro-switch 94 controls the solenoid valve in such a manner that the source of air under pressure is connected to conduit 88 and disconnected from conduit 89 so that air under pressure enters the lower compartment of the cylinder 6 via channel 80 and passage 81. Consequently the piston assembly 17 and the piston rod 25 are both displaced towards the position shown. During this displacement the cam surface 31 of the common control rod 25 comes into contact with the cam surface 71 of rod 67 due to which the latter rod 67 and hence the part 40, 41, 60 and associated elements are displaced towards the fixedly mounted tubular part 39.

If the casing 33 is not provided, it is impossible to remove the skinned wires before the common control rod has been moved back into its rest position since the gripping jaws then remain in their operative condition until that moment. Before reaching the position shown the end of the piston rod 25 however comes into contact with the closed end of the casing 33 due to which this part is displaced towards the position represented. Hereby the point K of the cam surface JKL glides over the cam surface NMG and then over the cam surface GF due to which the distance between the clamping jaws 45, 47 is first decreased and then increased to the value shown.

From the above it follows that in the rest position of the common control rod 25 the springs 53 and 70 are both in the compressed condition and the insulation stripping device is ready to perform another stripping operation.

It should be noted that instead of mounting the jaws 45, 61 and 62 in a fixed manner one could also mount them in the same way as the displaceable jaws 57, 74 and 75 respectively and also control them by a common control rod.

The above mentioned electrically controlled valve may also be mounted in the handgrip and instead of an electrically controlled valve one may also use a valve which is mechanically controlled by the trigger member 100 in a direct manner.

While the principles of the invention have been described above in connection with specific apparatus, it is to be clearly understood that this description is made only by way of example and not as a limitation on the scope of the invention.

What is claimed is:

1. Apparatus for stripping insulation from wire comprising:
   a stationary frame,
   cam means mounted on said frame and being longitudinally movable between a first position and a second position;
   wire gripping means mounted on said frame;
   insulation cutting means mounted on said frame;
   a pair of spring means one of which is interposed between said wire gripping means and said cam means, and the other between said cutting means and said cam means respectively, said spring means being pretensioned by said cam means in said first position for urging said wire gripping means and cutting means toward their respective operative positions;
   actuating means mounted on said frame for driving said cam means from said first position to said second position to release said pretensioned spring means into said operative positions for enabling said wire gripping means and cutting means to respectively grip said wire and cut the insulation of said wire.

2. Apparatus according to claim 1, wherein said wire gripping means and cutting means respectively include a pair of movable gripping jaws and a pair of movable cutting jaws, at least one of said wire gripping jaws and at least one of said cutting jaws being movably mounted on said frame.

3. Apparatus according to claim 2, wherein said wire gripping means and said insulation cutting means include a first and a second control rod, and said pair of spring means include a first and a second compressed spring, said first and second control rods being cocked by said first and said second compressed springs, respectively for urging said first and said second control rods into contact with said cam means.

4. Apparatus according to claim 3, wherein the other of said pair of gripping jaws and the other of said pair of insulation cutting jaws are fixedly mounted on said frame.

5. Apparatus according to claim 4, further including a pair of movable wire cutting jaws mounted on said frame wherein the movement of said wire cutting jaws is also controlled by said actuating means.

6. Apparatus according to claim 5, further including a third spring means wherein at least one of said wire cutting jaws is pretensioned by said third spring means, said wire cutting jaws changing from a rest position into an operative position for cutting said wire with the energy stored by said pretensioned third spring means as said cam means moves longitudinally from said first to said second position.

7. Apparatus according to claim 6, wherein said one of said wire cutting jaws is mounted on a third cocked control rod and is pretensioned by said third spring means.

8. Apparatus according to claim 7, wherein said third control rod is cocked by said third spring means in compressed condition which continuously urges said third control rod into contact with said cam means.

9. Apparatus according to claim 5, wherein said one of said wire cutting jaws is mounted on said second cocked control rod.

10. Apparatus according to claim 9, wherein said second control rod is cocked by said second compressed spring means.

11. Apparatus according to claim 10, wherein the other of said pair of wire cutting jaws is fixedly mounted on said frame.

12. Apparatus according to claim 11 wherein said first and second control rods are mounted such that they move in a direction transverse to the direction of the longitudinal movement of said cam means.

13. Apparatus according to claim 12, wherein said second control rod is longitudinally movable in a direction parallel to the direction of movement of said cam means.

14. Apparatus according to claim 13, wherein said cam means and said first and second control rods have cooperating cam surfaces enabling said cam means to move said control rods in said transverse direction, as said cam means moves longitudinally from said first position to said second position.

15. Apparatus according to claim 14, wherein said cam surfaces of said cam means includes means for controlling said longitudinal movement of said second control rod.

16. Apparatus according to claim 15, wherein said cam means includes means to cock and move said first control rod to a rest position near the end of the longitudinal movement of said second control rod.

17. Apparatus according to claim 16, wherein said cocking means includes a movable cylindrical casing which surrounds said cam means and which is provided at one end thereof with a lateral extension and at the other end thereof with a lateral cam surface, said cylindrical casing being movable by said second control rod, and said lateral extension and said lateral cam surface cocking said first control rod.

18. Apparatus according to claim 17, including a pneumatic chamber, a piston one end of which is coupled to said cam means and the other end of which is slideably mounted in said chamber, said piston dividing said chamber into two compartments, a source of fluid under pressure, two conduits for respectively coupling said fluid under pressure to the two compartments of said chamber, a trigger actuated valve selectively controlling the communication between said fluid source and said conduits in such a manner that only one of said conduits at a time establishes a communication between said source and one of said compartments.

19. Apparatus according to claim 17, wherein said frame includes a pistol-shaped hand-grip member, and said valve is mounted in said hand-grip member.

20. Apparatus according to claim 19, wherein said apparatus is adapted to strip insulation from wires branching out from a cable and includes a distance measuring member of predetermined length one end of which is secured to said frame and the other end of which is at a predetermined distance from said wire cutting jaws so that when said apparatus is brought into engagement with said cable said wire is cut off at said predetermined distance from said cable.

References Cited

UNITED STATES PATENTS 3,002,408   10/1961   Schwalm et al. _____ 81—9.51
3,154,980   11/1964   Hayden et al. _____ 81—9.51

THERON E. CONDON, Primary Examiner

R. V. PARKER, Jr., Assistant Examiner